(12) United States Patent
Yang

(10) Patent No.: US 12,090,833 B2
(45) Date of Patent: Sep. 17, 2024

(54) HYBRID-VEHICLE COOLING APPARATUS AND METHOD OF CONTROLLING SAME

(71) Applicants: Hyundai Motor Company, Seoul (KR); Kia Corporation, Seoul (KR)

(72) Inventor: Il Suk Yang, Gyeonggi-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 257 days.

(21) Appl. No.: 17/692,040

(22) Filed: Mar. 10, 2022

(65) Prior Publication Data

US 2023/0026768 A1    Jan. 26, 2023

(30) Foreign Application Priority Data

Jul. 22, 2021    (KR) .......................... 10-2021-0096517

(51) Int. Cl.
*B60K 11/02* (2006.01)
*B60K 6/40* (2007.10)
*B60K 6/26* (2007.10)

(52) U.S. Cl.
CPC ................ *B60K 11/02* (2013.01); *B60K 6/40* (2013.01); *B60K 2006/268* (2013.01)

(58) Field of Classification Search
CPC .... B60K 11/02; B60K 6/40; B60K 2006/268; B60K 11/04
See application file for complete search history.

(56) References Cited

U.S. PATENT DOCUMENTS

2002/0053216 A1*  5/2002  Ap .................... H01M 8/04768
                                                    165/283

FOREIGN PATENT DOCUMENTS

KR    10-2020-0057916    5/2020

* cited by examiner

*Primary Examiner* — Jacob M Amick
(74) *Attorney, Agent, or Firm* — MORGAN, LEWIS & BOCKIUS LLP

(57) ABSTRACT

A hybrid-vehicle cooling apparatus includes a radiator, a plurality of serial-connection cooling components serially disposed to be sequentially supplied with a refrigerant discharged from the radiator, a plurality of parallel-connection cooling components disposed to be in parallel supplied with the refrigerant flowing through the plurality of serial-connection cooling components, and an electric motor mounted in a serial-refrigerant-flow section formed by the plurality of serial-connection cooling components.

19 Claims, 5 Drawing Sheets

HYBRID-VEHICLE COOLING APPARATUS AND METHOD OF CONTROLLING SAME

CROSS REFERENCE TO RELATED APPLICATION

The present application claims priority to Korean Patent Application No. 10-2021-0096517, filed Jul. 22, 2021, the entire contents of which is incorporated herein for all purposes by this reference.

BACKGROUND OF THE PRESENT DISCLOSURE

Field of the Present Disclosure

The present disclosure relates to a technology associated with cooling of engine-related components and power electronics (PE) components that are mounted in a hybrid vehicle.

Description of Related Art

For driving a hybrid vehicle, an engine and a motor are mounted in the hybrid vehicle. A cooling apparatus is required for suitable cooling of engine-related components and PE components associated with the operation of the motor.

The cooling apparatus as described above needs to suitably perform a cooling function necessary for each component according to a condition for driving the hybrid vehicle.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a hybrid-vehicle cooling apparatus configured for cooling engine-related components and PE components, which are mounted in a hybrid vehicle, through an integrated cooling circuit, and a method of controlling the hybrid-vehicle cooling apparatus. With the hybrid-vehicle cooling apparatus and the method of controlling the hybrid-vehicle cooling apparatus, a temperature of intake air which is supplied to an engine may be suitably adjusted. Thus, an improvement in output of the engine, an improvement in fuel efficiency, and a reduction in harmful exhaust substances may be achieved. Furthermore, the startability of an engine may be improved, and optimization of temperatures of the PE components can improve the stability and durability of the hybrid vehicle.

According to various aspects of the present disclosure, there is a hybrid-vehicle cooling apparatus including: a radiator; a plurality of serial-connection cooling components serially arranged to be sequentially supplied with a refrigerant discharged from the radiator; a plurality of parallel-connection cooling components arranged to be in parallel supplied with the refrigerant flowing through the plurality of serial-connection cooling components; and an electric motor mounted in a serial-refrigerant-flow section formed by the plurality of serial-connection cooling components.

In the hybrid-vehicle cooling apparatus, the plurality of serial-connection cooling components may include an intercooler and a hybrid power control unit (HPCU), and the radiator, the intercooler, and the HPCU may be sequentially arranged, and a bypass valve configured for allowing the refrigerant from the radiator to flow for bypassing to the HPCU may be provided between the radiator and the intercooler.

In the hybrid-vehicle cooling apparatus, the plurality of serial-connection cooling components may further include an on-board charger (OBC), and a reservoir for the refrigerant, the electric pump, and the OBC may be sequentially arranged behind the HPCU.

In the hybrid-vehicle cooling apparatus, the plurality of parallel-connection cooling components may include a traction motor and an electric supercharger.

In the hybrid-vehicle cooling apparatus, the plurality of parallel-connection cooling components may further include a Hybrid Starter Generator (HSG) serially connected to the electric supercharger and in parallel connected to the traction motor.

The hybrid-vehicle cooling apparatus may further include: a refrigerant temperature detector configured for measuring a temperature of the refrigerant discharged from the radiator; a supercharged-air temperature detector configured for measuring a temperature of supercharged air introduced into the intercooler; an intake-air temperature detector configured for measuring a temperature of air flowing through the intercooler and being introduced into a combustion chamber; and a controller into which respective signals of the refrigerant temperature detector, the supercharged-air temperature detector, and the intake-air temperature detector are input and which controls the opening amount of the bypass valve.

According to various aspects of the present disclosure, there is provided a method of controlling a hybrid-vehicle cooling apparatus, the method including: comparing a temperature of intake air in a rear end portion of an intercooler with a predetermined reference intake-air temperature; comparing a temperature of a refrigerant with a temperature of supercharged air in a front end portion of the intercooler; and controlling a bypass valve so that the refrigerant supplied from a radiator to the intercooler is or is not allowed to flow for bypassing to a hybrid power control unit (HPCU), according to a result of the comparison of the temperature of the intake air with the reference intake-air temperature and a result of the comparison of the temperature of the refrigerant with the temperature of the supercharged air.

In the method, when the temperature of the intake air is equal to or lower than the reference intake-air temperature and the temperature of the refrigerant is higher than the temperature of the supercharged air, the bypass valve may be controlled so that the refrigerant is supplied to the intercooler without being allowed to flow for bypassing, and thus air flowing through the intercooler may be heated.

In the method, when the temperature of the intake air is equal to lower than the reference intake-air temperature and the temperature of the refrigerant is equal to lower than the temperature of the supercharged air, the bypass valve may be controlled so that the refrigerant is allowed to flow for bypassing, and thus the refrigerant may not be supplied to the intercooler, preventing the air flowing through the intercooler from being overcooled.

In the method, when the temperature of the intake air is higher than the reference intake-air temperature and the temperature of the refrigerant is equal to or lower than the temperature of the supercharged air, the bypass valve may be controlled so that the refrigerant is supplied to the intercooler without being allowed to flow for bypassing, cooling the air flowing through the intercooler.

In the method, when the temperature of the intake air is higher than the reference intake-air temperature and the temperature of the refrigerant is higher than the temperature of the supercharged air, the bypass valve may be controlled so that the refrigerant is allowed to flow for bypassing, and thus the refrigerant may not be supplied to the intercooler, preventing the air flowing through the intercooler from being overheated.

According to yet another aspect of the present disclosure, there is provided a method of controlling a hybrid-vehicle cooling apparatus; the method including: comparing a temperature of a refrigerant with a predetermined reference refrigerant temperature; comparing the temperature of the refrigerant with a temperature of intake air in a rear end portion of an intercooler; and performing heating, cooling, overheating prevention, or overcooling prevention on air flowing through the intercooler and supplied to a combustion chamber by adjusting an opening amount of a bypass valve according to a result of the comparison of the temperature of the refrigerant with the reference refrigerant temperature and a result of the comparison of the temperature of the refrigerant with the temperature of the intake air.

In the method, when the temperature of the refrigerant is equal to or lower than the reference refrigerant temperature and the temperature of the refrigerant is higher than the temperature of the intake air, the opening amount of the bypass valve may be lowered until the temperature of the intake air reaches a predetermined heating limit temperature, and thus an amount of the refrigerant supplied to the intercooler may be increased, heating the air flowing through the intercooler and being supplied to a combustion chamber.

In the method, when the temperature of the refrigerant is equal to or lower than the reference refrigerant temperature and the temperature of the refrigerant is equal to or lower than the temperature of the intake air, the opening amount of the bypass valve may be raised until the temperature of the intake air reaches a predetermined overcooling prevention temperature, and thus an amount of the refrigerant supplied to the intercooler may be decreased, preventing the air flowing through the intercooler and being supplied to a combustion chamber from being overcooled.

In the method, when the temperature of the refrigerant is higher than the reference refrigerant temperature and the temperature of the refrigerant is equal to lower than the temperature of the intake air, the opening amount of the bypass valve may be lowered until the temperature of the intake air reaches a predetermined cooling limit temperature, and thus an amount of the refrigerant supplied to the intercooler may be increased, cooling the air flowing through the intercooler and being supplied to a combustion chamber.

In the method, when the temperature of the refrigerant is higher than the reference refrigerant temperature and the temperature of the refrigerant is higher than the temperature of the intake air, the opening amount of the bypass valve may be raised until the temperature of the intake air reaches a predetermined overheating prevention temperature, and thus an amount of the refrigerant supplied to the intercooler may be decreased, preventing the air flowing through the intercooler and being supplied to a combustion chamber from being overheated.

According to an exemplary embodiment of the present disclosure, engine-related components and PE components that are mounted in a hybrid vehicle may be efficiently cooled through an integrated cooling circuit. The temperature of intake air which is supplied to an engine may be suitably adjusted. Thus, an improvement in output of the engine, an improvement in fuel efficiency, and a reduction in harmful exhaust substances may be achieved. Furthermore, the startability of an engine may be improved, and optimization of temperatures of the PE components can improve the stability and durability of the hybrid vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
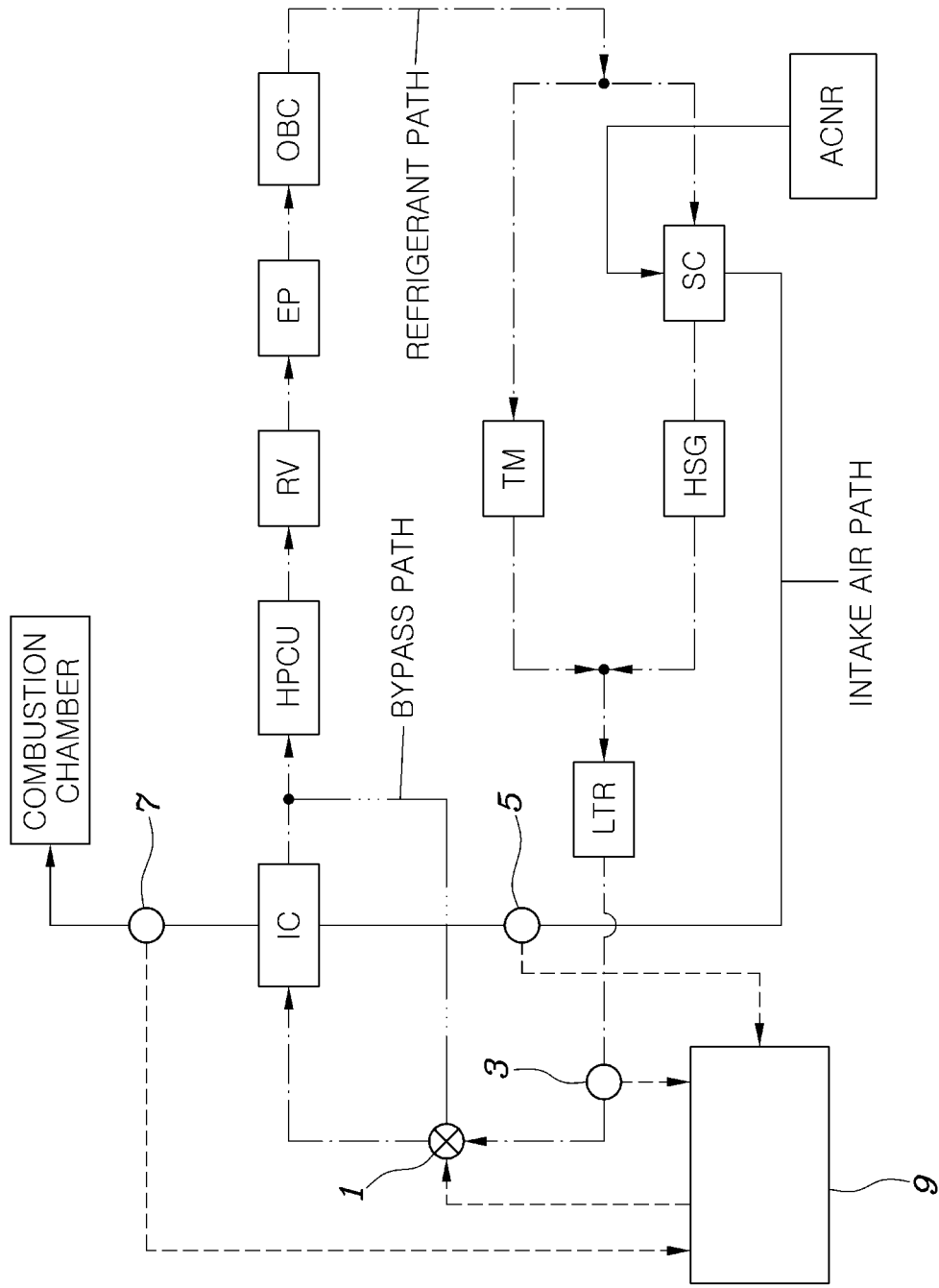
FIG. 1 is a view exemplarily illustrating a configuration of a hybrid-vehicle cooling apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

For illustrative purpose only, embodiments of the present disclosure disclosed in the exemplary embodiment will be described in terms of specific structures and functions. The embodiments of the present disclosure may be implemented in various ways and therefore should not be construed as limiting the present disclosure.

Various modifications may be made in various ways to the embodiments of the present disclosure. Therefore, specific embodiments will be described in detail below with reference to the accompanying drawings. However, the present description is not intended to limit the technical idea of the present disclosure to the specifically disclosed exemplary embodiments of the present disclosure. All alterations, equivalents, and substitutes that are included within the technical idea of the present disclosure should be understood as falling within the scope of the present disclosure.

The terms first, second, and so on may be used to describe various constituent elements but should not limit these constituent elements. Those terms are only used to distinguish one constituent element from another. For example, a first constituent element may be termed a second constituent element without departing from the scope of each claim that defines the present disclosure. Likewise, the second constituent element may also be termed the first constituent element.

It should be understood that, when a constituent element is referred to as being "coupled to" or "connected to" a different constituent element, this means that the constituent element may be coupled to or connected to the different constituent element or means that an intervening constituent element may be present therebetween. In contrast, it should be understood that, when a constituent element is referred to as being "directly coupled to" or "directly connected to" a different constituent element, this means that no intervening constituent element is present therebetween. This is true for expressions describing a relationship between constituent elements. For example, expressions such as "between" and "directly between" and expressions such as "adjacent to" and "directly adjacent to" should also be construed in the same manner.

The terms used throughout the present specification are only for describing specific embodiments and are not intended to limit the present disclosure. The indefinite article "a/an" is used to mean one or more, not only one, except as distinctively expressed in context. It should be understood that, throughout the present specification, the terms "include", "have", or the like is intended to indicate that a feature, a number, a step, an operation, a constituent element, a component, or any combination thereof is present, without precluding the presence or addition of one or more other features, numbers, steps, operations, constituent elements, or any combination thereof.

Unless otherwise defined, each of all terms used throughout the present specification, including technical or scientific terms, has the same meaning as is normally understood by a person of ordinary skill in the art to which an exemplary embodiment of the present disclosure pertains. The term as defined in commonly used dictionaries should be construed as having the same contextual meaning as that in the related art, and unless otherwise explicitly defined in the present specification, should not be construed as having an excessively implied meaning or a purely literal meaning.

Desired embodiments of the present disclosure will be described in detail below with reference to the accompanying drawings. The same reference character on the drawings refers to the same constituent element.

With reference to FIG. 1, a hybrid-vehicle cooling apparatus according to various exemplary embodiments of the present disclosure includes a radiator LTR; a plurality of serial-connection cooling components serially arranged to be sequentially supplied with a refrigerant discharged from the radiator LTR; a plurality of parallel-connection cooling components to be in parallel supplied with the refrigerant flowing through the plurality of serial-connection cooling components; and an electric pump EP mounted in a serial-refrigerant-flow section formed by the plurality of serial-connection cooling components.

That is, according to an exemplary embodiment of the present disclosure, a cooling circuit is provided, and the electric pump EP, mounted in the serial-refrigerant-flow section, performs a pumping operation of circulating the refrigerant. In the cooling circuit, the refrigerant discharged from the radiator LTR cools the serial-connection cooling components while sequentially flowing therethrough, then in parallel cools the parallel-connection cooling components, and circulates back into the radiator LTR.

The radiator LTR here is provided separately from a heat exchanger for cooling a combustion chamber and a cylinder block of an engine and may mean a low-temperature radiator which is managed so that a temperature of the refrigerant is relatively lower.

The plurality of serial-connection cooling components includes an intercooler IC and a hybrid power control unit (HPCU). The radiator LTR, the intercooler IC, and the HPCU are sequentially disposed. A bypass valve 1 is provided between the radiator LTR and the intercooler IC. The bypass valve 1 is configured for allowing the refrigerant from the radiator LTR to flow for passing to the HPCU.

The plurality of serial-connection cooling components may be configured to further include an on-board charger (OBC). According to the exemplary embodiment of the present disclosure, a configuration is employed where a reservoir RV for the refrigerant, the electric pump EP, and the OBC are disposed sequentially behind the HPCU.

That is, according to the exemplary embodiment of the present disclosure, the serial-refrigerant-flow section in which the refrigerant sequentially flows through the serially connected components corresponds to a section in which the intercooler IC, the HPCU, the reservoir RV, the electric pump EP, and the OBC are connected to each other.

The plurality of parallel-connection cooling components includes a traction motor TM and an electric supercharger SC.

That is, according to an exemplary embodiment of the present disclosure, a configuration is employed where the refrigerant cools the traction motor TM and the electric supercharger SC, which are mounted in parallel to each other, while in parallel flowing therethrough at the same time.

Furthermore, according to the exemplary embodiment of the present disclosure, the parallel-connection cooling components may be configured to further include a hybrid starter generator HSG which is serially connected to the electric supercharger SC and is in parallel connected to the traction motor TM.

Therefore, the refrigerant flowing through the serial-refrigerant-flow section bifurcates to cool the traction motor TM and the electric supercharger SC. A refrigerant cooling the electric supercharger SC further cools the HSG and then joins a refrigerant cooling the traction motor TM. The resulting refrigerant flows back into the radiator LTR.

The electric supercharger SC compresses air flowing from an air cleaner ACNR and supplies supercharged air resulting from the compression to the intercooler IC. The supercharged air is cooled while flowing through the intercooler IC and is supplied to the combustion chamber of the engine.

The cooling apparatus according to an exemplary embodiment of the present disclosure may be configured to further include a refrigerant temperature detector 3, a supercharged-air temperature detector 5, an intake-air temperature detector 7, and a controller 9. The refrigerant temperature detector 3 measures the temperature of the refrigerant discharged from the radiator LTR. The supercharged-air temperature detector 5 measures a temperature of the supercharged air which is introduced into the intercooler IC. The intake-air temperature detector 7 measures a temperature of air that flows through the intercooler IC and is introduced into the combustion chamber. Respective signals of the refrigerant temperature detector 3, the supercharged-air temperature detector 5, and the intake-air temperature detector 7 are input into the controller 9. Accordingly, the controller 9 controls the opening amount of the bypass valve 1.

Figure 2:
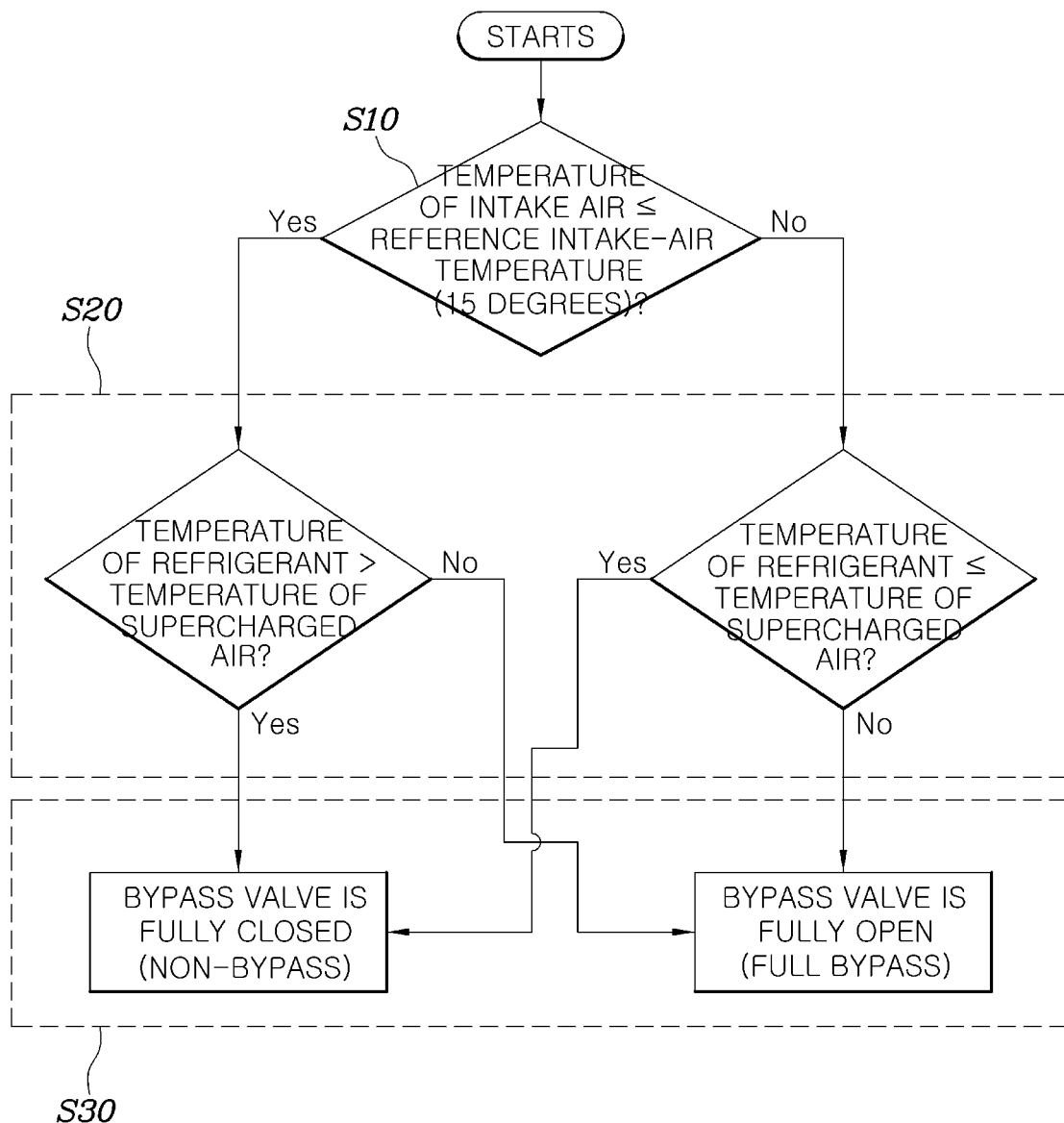
FIG. 2 is a flowchart for a method of performing control when an engine starts and when the engine initially operates, as a method of controlling the hybrid-vehicle cooling apparatus according to an exemplary embodiment of the present disclosure.

With reference to FIG. 2, a method of controlling the hybrid-vehicle cooling apparatus according to various exemplary embodiments of the present disclosure includes Step S10 of comparing a temperature of intake air in a rear end portion of an intercooler IC with a predetermined reference intake-air temperature; Step S20 of comparing a temperature of a refrigerant with a temperature of supercharged air in a front end portion of the intercooler IC; and Step S30 of controlling a bypass valve 1 so that the refrigerant supplied from a radiator LTR to the intercooler IC is or is not allowed to flow for bypassing to a hybrid power control unit (HPCU), according to a result of the comparison of the temperature of the intake-air with the reference intake-air temperature and a result of the comparison of the temperature of the refrigerant with the temperature of the supercharged air.

The reference intake-air temperature here may be set to a temperature with which it is determined whether the air that flows through the intercooler IC and is supplied to the combustion chamber of the engine is at a suitable level. The reference intake-air temperature may be set to, for example, 15° C.

For reference, unless otherwise stated throughout the exemplary embodiment, the "temperature of the intake air" means a temperature of air, as described above, that flows from the rear end portion of the intercooler IC toward the combustion chamber. The "temperature of the supercharged air" means a temperature of air which is supplied from the electric supercharger SC to the intercooler IC.

In a case where the temperature of the intake-air is equal to or lower than the reference intake-air temperature and where the temperature of the refrigerant is higher than the temperature of the supercharged air, the bypass valve 1 is controlled so that the refrigerant is supplied to the intercooler IC without being allowed to flow for bypassing. Thus, air flowing through the intercooler IC is heated.

That is, because a situation is reached where the temperature of the intake air in the rear end portion of the intercooler IC is equal to or lower than the reference intake-air temperature, the air flowing through the intercooler IC is heated with the refrigerant in order for the temperature of the intake air to reach the reference intake-air temperature.

In most cases, while a hybrid vehicle travels in an EV mode, in a case where an engine starting condition is satisfied, an engine of the hybrid vehicle starts. Therefore, a situation occurs where the temperature of the refrigerant that has already cooled PE components is higher than the temperature of the supercharged air. In the present situation, the too-low temperature of the intake air is increased as described above.

In a case where the temperature of the intake air is equal to or lower than the reference intake-air temperature and where the temperature of the refrigerant is equal to or lower than the temperature of the supercharged air, the bypass valve 1 is controlled so that the refrigerant is allowed to flow for bypassing, and thus the refrigerant is not supplied to the intercooler IC. Accordingly, the air flowing through the intercooler IC is prevented from being overcooled.

That is, a situation is reached where the temperature of the intake air is equal to or lower than the reference intake-air temperature, but the temperature of the refrigerant is also equal to or lower than the temperature of the supercharged air. Thus, when the refrigerant is supplied to the intercooler IC, the temperature of the intake air is further lowered. This situation is not a desirable state for a combustion process in the engine. For this reason, the refrigerant is all allowed to flow for bypassing, preventing air overcooling.

In a case where the temperature of the intake air is higher than the reference intake-air temperature and where the temperature of the refrigerant is equal to or lower than the temperature of the supercharged air, the bypass valve 1 is controlled so that the refrigerant is supplied to the intercooler IC without being allowed to flow for bypassing. Thus, the air flowing through the intercooler IC is cooled.

That is, because the temperature of the refrigerant is equal to or lower than the temperature of the supercharged air, the refrigerant is all supplied to the intercooler IC to lower the temperature of the intake air higher than the reference intake-air temperature. Thus, the supercharged air flowing through the intercooler IC is cooled by the refrigerant.

In a case where the temperature of the intake air is higher than the reference intake-air temperature and where the temperature of the refrigerant is higher than the temperature of the supercharged air, the bypass valve 1 is controlled so that the refrigerant is allowed to flow for bypassing, and thus the refrigerant is not supplied to the intercooler IC. Accordingly, the air flowing through the intercooler IC is prevented from being overheated.

That is, because a situation is reached where the temperature of the intake air is higher than the reference intake-air temperature, the temperature of the intake air is further raised when the refrigerant of which the temperature is higher than the temperature of the supercharged air is supplied to the intercooler IC. Therefore, as described above, the refrigerant is all allowed to flow for bypassing. Accordingly, the supercharged air is not heated when flowing through the intercooler IC.

The control as described above is usefully performed to suitably adjust the temperature of intake air which is supplied in situations such as engine starting and engine operating.

Figure 3:
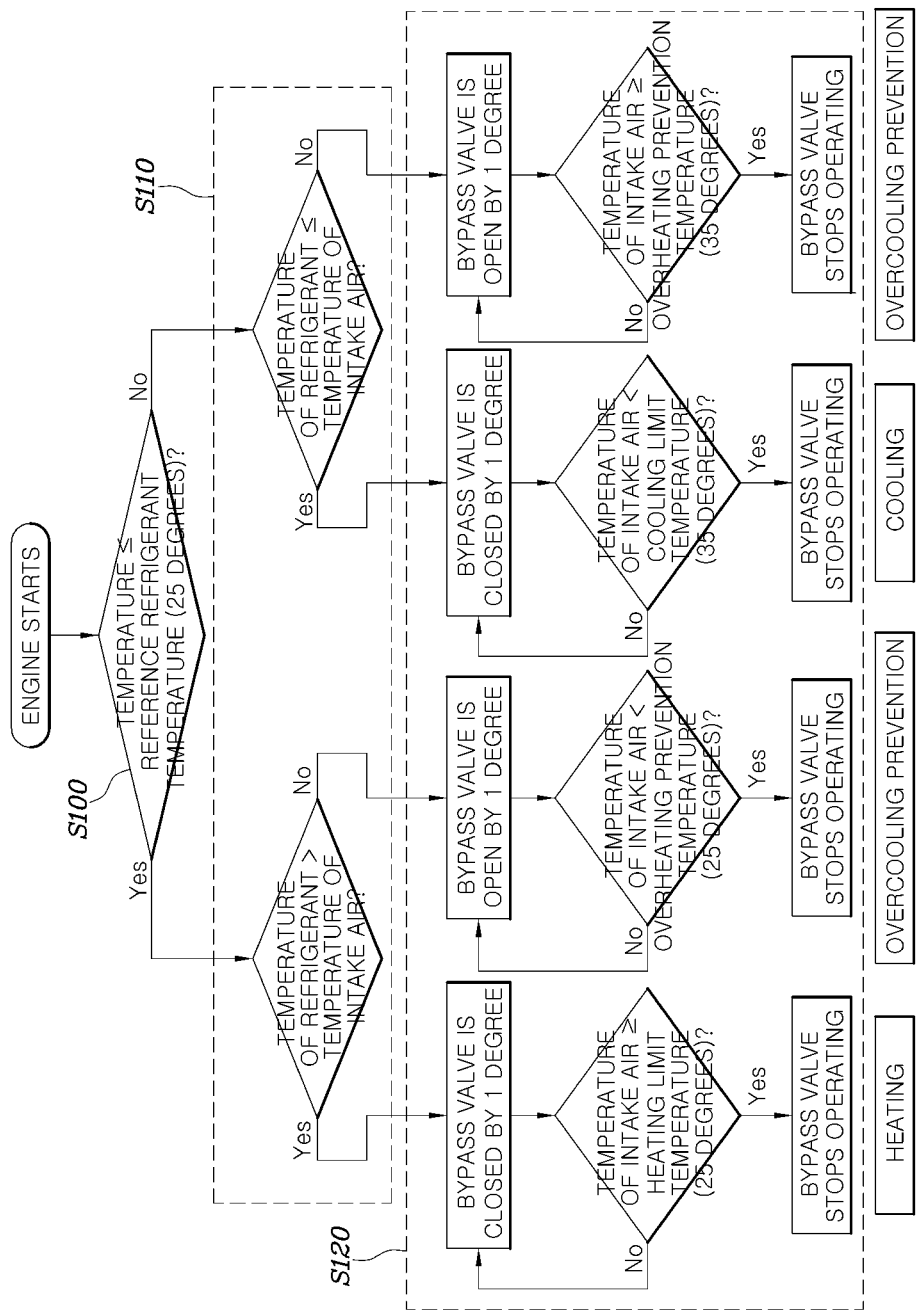
FIG. 3 is a flowchart for a method of performing control while the engine operates, as the method of controlling the hybrid-vehicle cooling apparatus according to an exemplary embodiment of the present disclosure.

With reference to FIG. 3, a method of controlling the hybrid-vehicle cooling apparatus according to various exemplary embodiments of the present disclosure includes Step S100 of comparing a temperature of a refrigerant with a predetermined reference refrigerant temperature; Step S110 of comparing the temperature of the refrigerant with a temperature of intake air in a rear end portion of an intercooler IC; and Step S120 of performing heating, cooling, overheating prevention, or overcooling prevention on air flowing through the intercooler IC and supplied to a combustion chamber by adjusting an opening amount of a bypass valve 1 according to a result of the comparison of the temperature of the refrigerant with the reference refrigerant temperature and a result of the comparison of the temperature of the refrigerant with the temperature of the intake air.

That is, according to the present exemplary embodiment of the present disclosure, the bypass valve 1 is controlled, depending on the temperature of the refrigerant. Thus, heating, cooling, overheating prevention, or overcooling prevention is performed on the air which is applied to the engine.

The reference refrigerant temperature here may be set to, for example, 25° C.

In a case where the temperature of the refrigerant is equal to or lower than the reference refrigerant temperature and where the temperature of the refrigerant is higher than the temperature of the intake air, the opening amount of the bypass valve 1 is gradually lowered until the temperature of the intake air reaches a predetermined heating limit temperature. Thus, an amount of the refrigerant which is supplied to the intercooler IC is increased. Accordingly, the air that flows through the intercooler IC and is supplied to the combustion chamber is heated.

That is, because a state is reached where the temperature of the refrigerant is equal to or lower than the reference refrigerant temperature but is higher than the temperature of the intake air, the opening amount of the bypass valve 1 is gradually lowered so that the air which is supplied to the intercooler IC and then to the engine is heated. Thus, the amount of the refrigerant which is supplied to the intercooler IC is increased.

The opening amount of the bypass valve 1 here may be adjusted by an increment or decrement of, for example, 1. It is desirable that, whenever the opening amount is adjusted by an increment or decrement of 1, that is, after the time during which the temperature of the intake air may be substantially influenced elapses, it is determined whether the heating limit temperature reaches the temperature of the intake air.

The heating limit temperature may be set to, for example, 25° C.

For example, when a situation is assumed where the external temperature is 0° C. and where a state of charge (SOC) value of a hybrid vehicle battery is at a high level so that the engine starts while the hybrid vehicle travels in the EV mode, the temperature of the refrigerant is raised to approximately 15° C. due to heat generated in the PE components. However, the temperature of the refrigerant is lower than the reference refrigerant temperature of 25° C. and is higher than the 0° C. temperature of the intake air. Therefore, as described above, a condition for the control for gradually lowering the opening amount of the bypass valve 1 may be satisfied.

In a situation as described above, the bypass valve 1 is controlled so that the opening amount thereof is gradually lowered, and thus the amount of the refrigerant which is supplied to the intercooler IC is increased. Accordingly, the temperature of the intake air may be raised relatively rapidly to the heating limit temperature of 25° C.

Of course, when the temperature of the intake air reaches the heating limit temperature, the bypass valve 1 is set to maintain the opening amount which is reached at that time.

Figure 4:
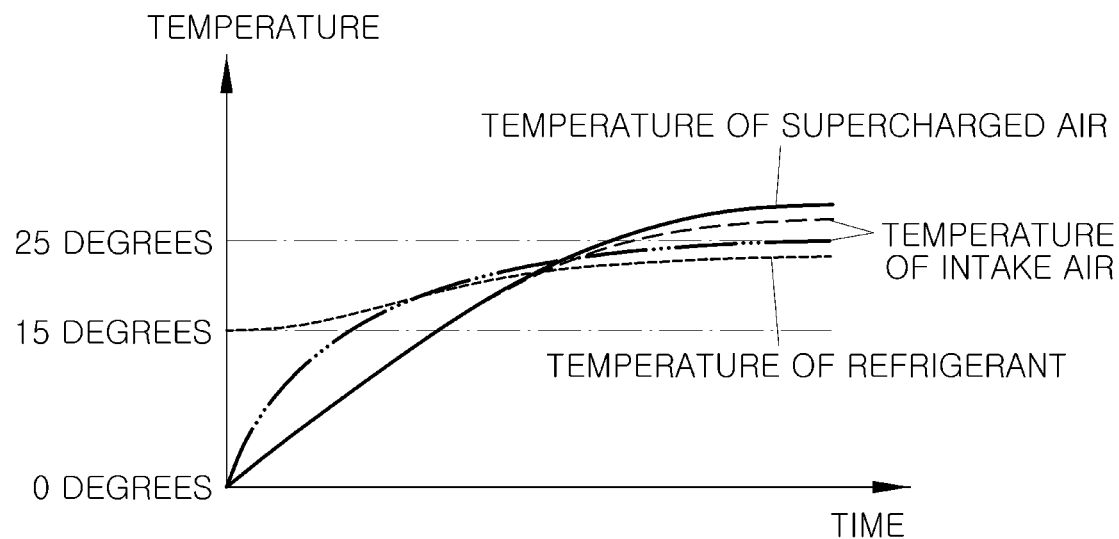
FIG. 4, FIG. 5, FIG. 6 and FIG. 7 are graphs showing examples where heating, cooling, overheating prevention, and overcooling prevention are performed on air which is supplied to a combustion chamber.

As may be seen from FIG. 4, in a case where the control as described above is not performed, the temperature of the intake air is gradually increased as indicated by a dotted line. However, as can also be seen from FIG. 4, when the control according to an exemplary embodiment of the present disclosure, as described above, is performed, the temperature of the intake air more rapidly reaches the heating limit temperature as indicated by a line including repeated three dots and dash, and the raised state of the temperature of the intake air may be stably maintained.

In a case where the temperature of the refrigerant is equal to or lower than the reference refrigerant temperature and where the temperature of the refrigerant is equal to or lower than the temperature of the intake air, the opening amount of the bypass valve 1 is gradually raised until the temperature of the intake air reaches a predetermined overcooling prevention temperature. Thus, the amount of the refrigerant which is applied to the intercooler IC is decreased. Accordingly, the air that flows through the intercooler IC and is supplied to the combustion chamber is prevented from being overcooled.

That is, because the temperature of the refrigerant is in a range of temperatures that are equal to or lower than the reference refrigerant temperature and the temperature of the intake air, the amount of the refrigerant which is supplied to the intercooler IC is decreased, and an amount of the refrigerant allowed to flow for bypassing is increased. Thus, the air which is supplied to the combustion chamber is prevented from being overcooled by the intercooler IC.

The overcooling prevention temperature here may be set to, for example, 25° C.

For example, when a situation is considered where the external temperature is 0° C. and that only the engine starts because of the low-level SOC value of the battery, the temperature of the refrigerant is lower than the reference refrigerant temperature of 25° C. and is also lower than the temperature of the intake air.

Therefore, in the instant case, as described above, the bypass valve 1 is controlled so that the amount of the refrigerant allowed to flow for bypassing is gradually increased. Thus, the amount of the refrigerant which is supplied to the intercooler IC is decreased. Accordingly, the air that flows through the intercooler IC may be prevented from being overcooled.

Figure 5:
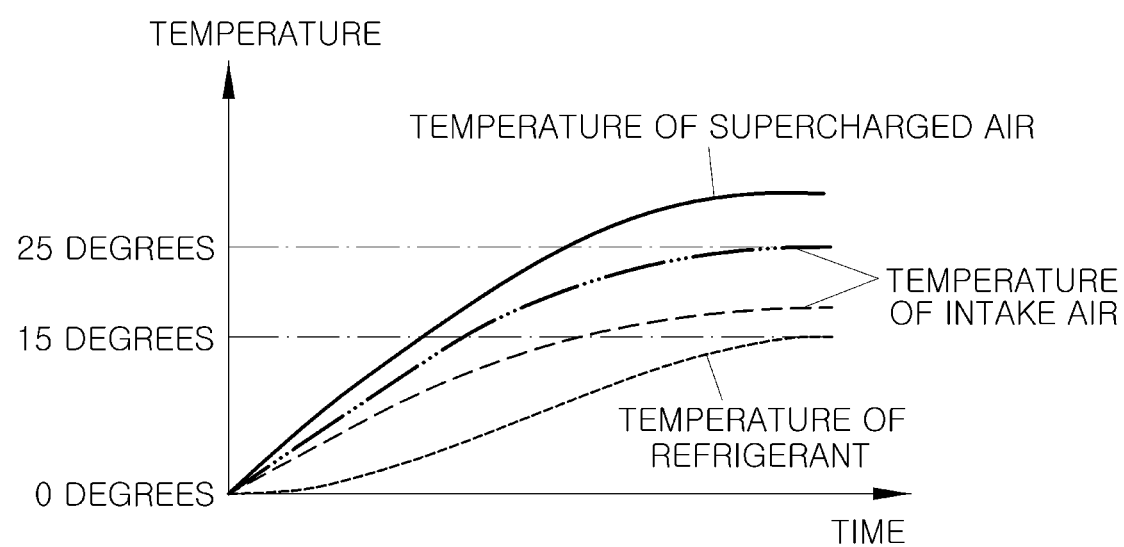

As may be seen from FIG. 5, with the control as described above, the temperature of the intake air reaches the overcooling prevention temperature of 25° C. more rapidly, as is indicated by a line including repeated three dots and dash, than the temperature of the intake air, as indicated by a dotted line, that results when the control of the bypass valve 1, as described above, is not performed.

In a case where the temperature of the refrigerant is higher than the reference refrigerant temperature and where the temperature of the refrigerant is equal to or lower than the temperature of the intake air, the opening amount of the bypass valve 1 is gradually lowered until the temperature of the intake air reaches a predetermined cooling limit temperature. Thus, the amount of the refrigerant which is supplied to the intercooler IC is increased. Accordingly, the air that flows through the intercooler IC and is supplied to the combustion chamber is cooled.

That is, in a case where the temperature of the refrigerant is higher than the reference refrigerant temperature, but is equal to or lower than the temperature of the intake air, the amount of the refrigerant which is supplied to the intercooler IC is gradually increased. Thus, the air that flows through the intercooler IC is further cooled. Accordingly, the cooling limit temperature is reached.

The cooling limit temperature here may be set to, for example, 35° C.

For example, when the situation is considered where the external temperature is 25° C. and where only the engine starts because of the low-level SOC value of the battery, the temperature of the refrigerant is equal to or greater than 25° C. Therefore, the temperature of the refrigerant is in a state of being higher than the reference refrigerant temperature and is lower than the temperature of the intake air.

Therefore, in the instant case, as described above, the control for increasing the amount of the refrigerant which is supplied to the intercooler IC may be performed.

Figure 6:
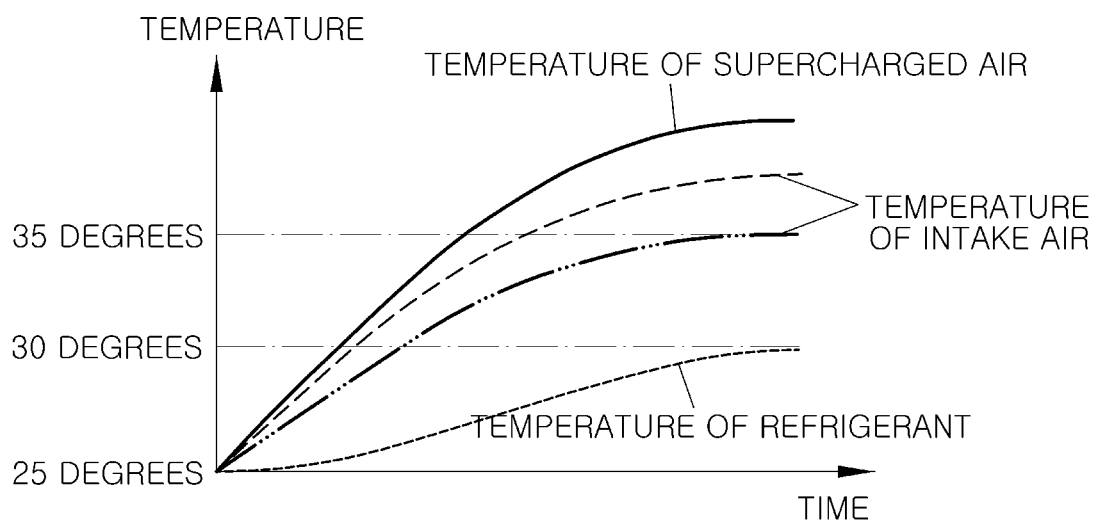

In FIG. 6, the result of performing the control as described above is indicated by a line including repeated three dots and dash, and the result of not performing the control as described above is indicated by a dotted line. As may be seen from FIG. 6, in a case where the control as described above is performed, the effect of cooling the air that flows through the intercooler IC is increased. Accordingly, the temperature of the intake air is more cooled than indicated by the dotted line, and thus gradually reaches the cooling limit temperature of 35° C.

In a case where the temperature of the refrigerant is higher than the reference refrigerant temperature and where the temperature of the refrigerant is higher than the temperature of the intake air, the opening amount of the bypass valve 1 is gradually raised until the temperature of the intake air reaches a predetermined overheating prevention temperature. Thus, the amount of the refrigerant which is supplied to the intercooler IC is decreased. Accordingly, the air that flows through the intercooler IC and is supplied to the combustion chamber is prevented from being overheated.

That is, in the case where the temperature of the refrigerant is higher than both the reference refrigerant temperature and the temperature of the intake air, the amount of the refrigerant which is supplied to the intercooler IC is decreased. Thus, the air which is supplied to the combustion chamber through the intercooler IC is prevented from being excessively heated.

The overheating prevention temperature here may be set to, for example, 35° C.

Figure 7:
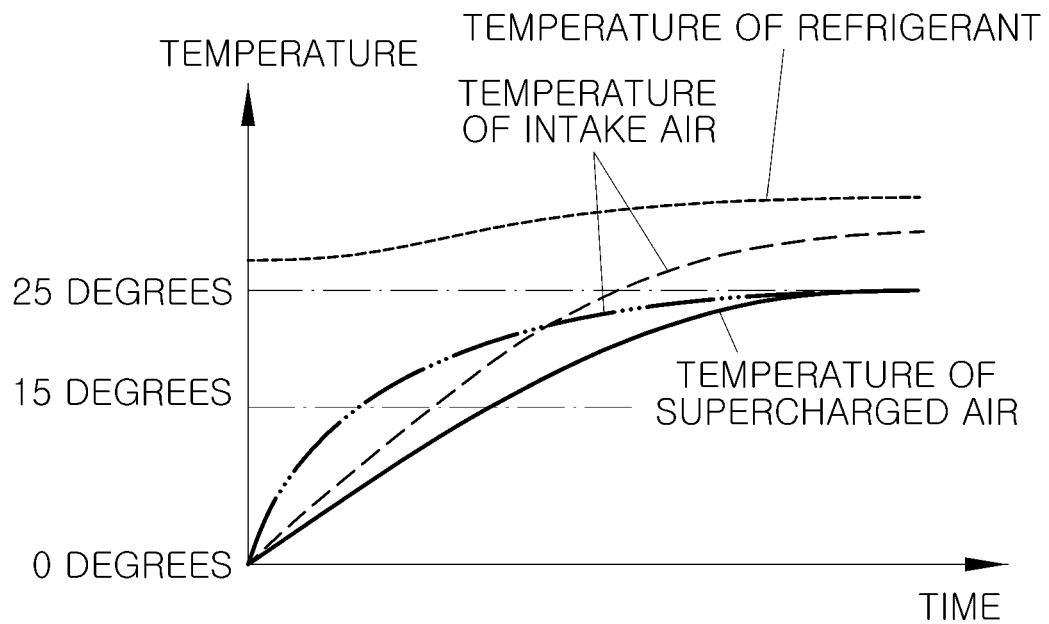

For example, as a situation where the external temperature is 25° C. and where the engine starts because of the high-level SOC value of the battery while the hybrid vehicle travels in the EV mode, a situation may occur where, due to the heat generated in the PE components, the temperature of the refrigerant, as illustrated in FIG. 7, is higher than the reference refrigerant temperature of 25° C. and is also higher than the temperature of the intake air. In the instant case, it is desirable that, as described above, the amount of the refrigerant which is supplied to the intercooler IC is decreased and that the air which is supplied to the combustion chamber through the intercooler IC is prevented from being excessively heated.

In FIG. 7, the temperature of the intake air that results when performing the control as described above is indicated by a line including repeated three dots and dash, and the temperature of the intake air that results when not performing the control as described above is indicated by a dotted line. As may be seen from FIG. 7, with the control as described above, the temperature of the intake air rapidly reaches the overheating prevention temperature without being excessively heated.

Furthermore, the term related to a control device such as "controller", "control apparatus", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:
1. A hybrid-vehicle cooling apparatus comprising:
a radiator;

a plurality of serial-connection cooling components serially disposed to be sequentially supplied with a refrigerant discharged from the radiator;

a plurality of parallel-connection cooling components disposed to be in parallel supplied with the refrigerant flowing through the plurality of serial-connection cooling components; and an electric pump mounted in a serial-refrigerant-flow section formed by the plurality of serial-connection cooling components, wherein the plurality of serial-connection cooling components includes:
an intercooler; and
a hybrid power control unit (HPCU),
wherein the radiator, the intercooler, and the HPCU are sequentially disposed, and
wherein a bypass valve configured for allowing the refrigerant from the radiator to flow for bypassing to the HPCU is provided between the radiator and the intercooler.

2. The hybrid-vehicle cooling apparatus of claim 1,
wherein the plurality of serial-connection cooling components further includes an on-board charger (OBC), and
wherein a reservoir for the refrigerant, the electric pump, and the OBC are sequentially disposed behind the HPCU.

3. The hybrid-vehicle cooling apparatus of claim 1, wherein the plurality of parallel-connection cooling components includes:
a traction motor; and
an electric supercharger.

4. The hybrid-vehicle cooling apparatus of claim 3, wherein the plurality of parallel-connection cooling components further includes:
a Hybrid Starter Generator (HSG) serially connected to the electric supercharger and in parallel connected to the traction motor.

5. The hybrid-vehicle cooling apparatus of claim 1, further including:
a refrigerant temperature detector configured for measuring a temperature of the refrigerant discharged from the radiator;
a supercharged-air temperature detector configured for measuring a temperature of supercharged air introduced into the intercooler;
an intake-air temperature detector configured for measuring a temperature of air flowing through the intercooler and being introduced into a combustion chamber; and
a controller into which respective signals of the refrigerant temperature detector, the supercharged-air temperature detector, and the intake-air temperature detector are input and which controls an opening amount of the bypass valve.

6. The hybrid-vehicle cooling apparatus of claim 5, wherein the controller is configured for:
comparing the temperature of the air in a rear end portion of the intercooler with a predetermined reference intake-air temperature;
comparing the temperature of the refrigerant with the temperature of the supercharged air in a front end portion of the intercooler; and
controlling the bypass valve so that the refrigerant supplied from the radiator to the intercooler is or is not allowed to flow for bypassing to the hybrid power control unit (HPCU), according to a result of the comparison of the temperature of intake air with the reference intake-air temperature and a result of the comparison of the temperature of the refrigerant with the temperature of the supercharged air.

7. The hybrid-vehicle cooling apparatus of claim 6, wherein when the temperature of the intake air is equal to or lower than the reference intake-air temperature and the temperature of the refrigerant is higher than the temperature of the supercharged air, the controller is configured to control the bypass valve so that the refrigerant is supplied to the intercooler without being allowed to flow for bypassing, and thus the air flowing through the intercooler is heated.

8. The hybrid-vehicle cooling apparatus of claim 6, wherein when the temperature of the intake air is equal to lower than the reference intake-air temperature and the temperature of the refrigerant is equal to lower than the temperature of the supercharged air, the controller is configured to control the bypass valve so that the refrigerant is allowed to flow for bypassing, and thus the refrigerant is not supplied to the intercooler, preventing the air flowing through the intercooler from being overcooled.

9. The hybrid-vehicle cooling apparatus of claim 6,
wherein when the temperature of the intake air is higher than the reference intake-air temperature and the temperature of the refrigerant is equal to or lower than the temperature of the supercharged air, the controller is configured to control the bypass valve so that the refrigerant is supplied to the intercooler without being allowed to flow for bypassing, cooling the air flowing through the intercooler, and
wherein when the temperature of the intake air is higher than the reference intake-air temperature and the temperature of the refrigerant is higher than the temperature of the supercharged air, the controller is configured to control the bypass valve so that the refrigerant is allowed to flow for bypassing, and thus the refrigerant is not supplied to the intercooler, preventing the air flowing through the intercooler from being overheated.

10. A method of controlling a hybrid-vehicle cooling apparatus, the method comprising:
comparing, by a controller, a temperature of intake air in a rear end portion of an intercooler with a predetermined reference intake-air temperature;
comparing, by the controller, a temperature of a refrigerant with a temperature of supercharged air in a front end portion of the intercooler; and
controlling, by the controller, a bypass valve so that the refrigerant supplied from a radiator to the intercooler is or is not allowed to flow for bypassing to a hybrid power control unit (HPCU), according to a result of the comparison of the temperature of the intake air with the reference intake-air temperature and a result of the comparison of the temperature of the refrigerant with the temperature of the supercharged air.

11. The method of claim 10, wherein when the temperature of the intake air is equal to or lower than the reference intake-air temperature and the temperature of the refrigerant is higher than the temperature of the supercharged air, the bypass valve is controlled by the controller so that the refrigerant is supplied to the intercooler without being allowed to flow for bypassing, and thus the air flowing through the intercooler is heated.

12. The method of claim 10, wherein when the temperature of the intake air is equal to lower than the reference intake-air temperature and the temperature of the refrigerant is equal to lower than the temperature of the supercharged air, the bypass valve is controlled by the controller so that the refrigerant is allowed to flow for bypassing, and thus the refrigerant is not supplied to the intercooler, preventing the air flowing through the intercooler from being overcooled.

13. The method of claim 10, wherein when the temperature of the intake air is higher than the reference intake-air temperature and the temperature of the refrigerant is equal to or lower than the temperature of the supercharged air, the bypass valve is controlled by the controller so that the refrigerant is supplied to the intercooler without being allowed to flow for bypassing, cooling the air flowing through the intercooler.

14. The method of claim 10, wherein when the temperature of the intake air is higher than the reference intake-air temperature and the temperature of the refrigerant is higher than the temperature of the supercharged air, the bypass valve is controlled by the controller so that the refrigerant is allowed to flow for bypassing, and thus the refrigerant is not supplied to the intercooler, preventing the air flowing through the intercooler from being overheated.

15. A method of controlling a hybrid-vehicle cooling apparatus, the method comprising:
comparing, by a controller, a temperature of a refrigerant with a predetermined reference refrigerant temperature;
comparing, by the controller, the temperature of the refrigerant with a temperature of intake air in a rear end portion of an intercooler; and
performing, by the controller, heating, cooling, overheating prevention, or overcooling prevention on air flowing through the intercooler and supplied to a combustion chamber by adjusting an opening amount of a bypass valve according to a result of the comparison of the temperature of the refrigerant with the reference refrigerant temperature and a result of the comparison of the temperature of the refrigerant with the temperature of the intake air.

16. The method of claim 15, wherein when the temperature of the refrigerant is equal to or lower than the reference refrigerant temperature and the temperature of the refrigerant is higher than the temperature of the intake air, the opening amount of the bypass valve is lowered until the temperature of the intake air reaches a predetermined heating limit temperature, and thus an amount of the refrigerant supplied to the intercooler is increased, heating the air flowing through the intercooler and being supplied to a combustion chamber.

17. The method of claim 15, wherein when the temperature of the refrigerant is equal to or lower than the reference refrigerant temperature and the temperature of the refrigerant is equal to or lower than the temperature of the intake air, the opening amount of the bypass valve is raised until the temperature of the intake air reaches a predetermined overcooling prevention temperature, and thus an amount of the refrigerant supplied to the intercooler is decreased, preventing the air flowing through the intercooler and being supplied to a combustion chamber from being overcooled.

18. The method of claim 15, wherein when the temperature of the refrigerant is higher than the reference refrigerant temperature and the temperature of the refrigerant is equal to lower than the temperature of the intake air, the opening amount of the bypass valve is lowered until the temperature of the intake air reaches a predetermined cooling limit temperature, and thus an amount of the refrigerant supplied to the intercooler is increased, cooling the air flowing through the intercooler and being supplied to a combustion chamber.

19. The method of claim 15, wherein when the temperature of the refrigerant is higher than the reference refrigerant temperature and the temperature of the refrigerant is higher than the temperature of the intake air, the opening amount of the bypass valve is raised until the temperature of the intake air reaches a predetermined overheating prevention temperature, and thus an amount of the refrigerant supplied to the intercooler is decreased, preventing the air flowing through the intercooler and being supplied to a combustion chamber from being overheated.

* * * * *